(12) United States Patent
Liang et al.

(10) Patent No.: US 8,769,647 B2
(45) Date of Patent: Jul. 1, 2014

(54) METHOD AND SYSTEM FOR ACCESSING 3rd GENERATION NETWORK

(75) Inventors: Jiehui Liang, Guangdong Province (CN); Yuanqing Shi, Guangdong Province (CN); Jiabing Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 114 days.

(21) Appl. No.: 13/257,913

(22) PCT Filed: Sep. 23, 2009

(86) PCT No.: PCT/CN2009/074143
§ 371 (c)(1),
(2), (4) Date: Sep. 20, 2011

(87) PCT Pub. No.: WO2010/130121
PCT Pub. Date: Nov. 18, 2010

(65) Prior Publication Data
US 2012/0131329 A1    May 24, 2012

(30) Foreign Application Priority Data

May 15, 2009   (CN) .......................... 2009 1 0140445

(51) Int. Cl.
H04L 29/06   (2006.01)
H04W 12/06   (2009.01)
H04L 12/46   (2006.01)
H04W 84/12   (2009.01)

(52) U.S. Cl.
CPC .......... *H04L 12/4625* (2013.01); *H04W 84/12* (2013.01); *H04L 63/0892* (2013.01); *H04L 12/4633* (2013.01); *H04L 63/166* (2013.01); *H04L 63/0823* (2013.01); *H04W 12/06* (2013.01)
USPC ............................................. 726/7; 380/270

(58) Field of Classification Search
None
See application file for complete search history.

(56) References Cited

U.S. PATENT DOCUMENTS

2003/0139180 A1    7/2003  McIntosh et al.
2003/0236982 A1*  12/2003  Hsu .............................. 713/171
2008/0069105 A1*   3/2008  Costa et al. ................... 370/392

FOREIGN PATENT DOCUMENTS

CN   101013940 A   8/2007
CN   101056177 A  10/2007
CN   101079786 A  11/2007

OTHER PUBLICATIONS

P. Funk et al., Extensible Authentication Protocol Tunneled Transport Layer Security Authenticated Protocol Version 0 (EAP-TTLSv0), RFC 5281, Aug. 2008.

(Continued)

Primary Examiner — Gilberto Barron, Jr.
Assistant Examiner — Simon Kanaan
(74) Attorney, Agent, or Firm — Ling Wu; Stephen Yang; Ling and Yang Intellectual Property LLC

(57) ABSTRACT

A method for accessing a 3G network includes: a terminal accessing a wireless local area network by adopting a WAPI protocol, and notifying an AAA server of a 3G network through an AP of the wireless local area network that the terminal intends to access the 3G network; the AAA server obtaining identity information of the terminal through the AP, and performing an EAP-TLS negotiation process with the terminal through the AP after determining that the terminal is a subscription terminal of the 3G network according to the identity information; and the terminal accessing the 3G network after finishing the EAP-TLS negotiation process. A system for accessing a 3G network includes an AP of a wireless local area network and an AAA server of a 3G network. The present invention reduces unnecessary processes the message interacting, the certificate verification, the signature verification, and so on and improves the system efficiency.

13 Claims, 3 Drawing Sheets

(56) References Cited

OTHER PUBLICATIONS

3GPP TSG SA, Wireless Local Area Network (WLAN) interworking security (Release 8), 3GPP TS 33.234 V8.1.0, Mar. 2008.

International Search Report for PCT/CN2009/074143 dated Jan. 16, 2010.

G. Kambourakis et al; "Advanced SSL/TLS-based authentication for secure WLAN-3G interworking"; WLAN Systems and Interworking; IEE Proc.-Commun., vol. 151. No. 5, Oct. 2004; XP 6022627A; See pp. 501-506.

"A New Authentication Mechanism for Loosely Coupled 3G-WLAN Integrated Networks"; P. Prasithsangaree and P. Krishnamurthy, Telecommunication Program, School of Information Science, University of Pittsburgh, Pittsburgh, PA, USA. {phongsak, prashant}@mail.sis.pitt.edu; XP 10766800A; See pp. 2998-3003.

* cited by examiner

METHOD AND SYSTEM FOR ACCESSING 3rd GENERATION NETWORK

TECHNICAL FIELD

The present invention relates to the communication field, and particularly, to a method and system for accessing a 3rd Generation (3G) network.

BACKGROUND OF THE RELATED ART

In order to cope with the potential security hazard existing in security mechanisms, such as Wired Equivalent Privacy (WEP) and Wi-Fi Protected Access (WPA) of the Institute of Electrical and Electronics Engineers (IEEE) 802.11 of the wireless local network, the WLAN Authentication Privacy Infrastructure (WAPI) security protocol is proposed. The protocol implements the peer authentication of the Authentication Supplicant Entity (ASUE, which is set in a terminal) and the Authenticator Entity (AE, which is set in an access point), which ensures the link layer security of the Wireless Local Area Network (WLAN).

The WAPI security protocol supports two formats of certificates: the GBW (national standard material) certificate and the X.509 v3 certificate. The X.509 v3 certificate supports various extended attributes/fields, including: the key identification, the key usage, the extended key usage, the Certificate Revocation List (CRL) distribution point, the certificate policy, the certificate institution policy mapping, the alias of the certificate subject, the alias of the issuer and the certificate subject catalog attribute.

As shown in FIG. 1, after the wireless local area network terminal (terminal for short) finishes the access authentication, if the wireless local area network connects with the Internet, then the terminal can access the Internet through the wireless local area network; however, for the 3rd Generation (3G) network, the terminal also need pass through the access authentication of the Authentication Authorization Accounting (AAA) server of the 3G network, then it can access the 3G network resources such as the circuit service and the packet service and so on after.

The AAA server is in charge of performing the access authentication to the terminal which has the Internet Protocol (IP) capability, searching the user information stored in the Home Subscriber Server (HSS), judging whether the current user is legal, maintaining the continuity of the WLAN access, providing the roaming function of the WLAN, generating the bill of accessing the 3G network by the user, and reporting to the user. If the 3G network applies the Quality of Service (QoS) mechanism, then the AAA server is also required to implement the authorizing and storing the QoS configuration of the wireless local area network, and to map it into the wireless local area network acting as the access network.

In the prior art, the AAA server of the 3G network adopts the Extensible Authentication Protocol-Subscriber Identification Module (EAP-SIM) and the Extensible Authentication Protocol-Authentication and Key Agreement (EAP-AKA) to perform the access authentication to the wireless local area terminal which adopts the IEEE 802.11 i as the security mechanism. These two authentication mechanisms need that the terminal has the capability of reading the Universal Integrated Circuit Card (UICC), which restricts that the wireless local area network terminal user must use multiple-mode terminal to enjoy the 3G network services. However, for the WLAN terminal which adopts the WAPI security mechanism but does not have the capability of reading the UICC, the 3rd Generation Partnership Project (3GPP) organization has not proposed a technical scheme on how to access the 3G network yet.

CONTENT OF THE INVENTION

The technical problem to be solved in the present invention is to overcome drawbacks in the prior art, and to provide a method and system for accessing the 3G network, which enables the WLAN terminal which adopts the WAPI security mechanism but does not have the capability of reading the UICC to securely access the 3G network.

The present invention provides a method for accessing a 3G network, comprising:

a terminal accessing a wireless local area network by adopting a Wireless Local Area Network Authentication Privacy Infrastructure (WAPI) protocol, and then notifying an Authentication Authorization Accounting (AAA) server of a 3G network through an access point (AP) of the wireless local area network that said terminal intends to access the 3G network;

said AAA server obtaining identity information of said terminal through the AP, determines that said terminal is a subscription terminal of the 3G network according to said identity information, and then performing an Extensible Authentication Protocol-Transport Layer Security (EAP-TLS) negotiation process with said terminal through the AP; and said terminal accessing the 3G network after finishing the EAP-TLS negotiation process.

The step of notifying the AAA server that said terminal intends to access the 3G network can comprise:

said terminal sending a start packet of the extensible authentication protocol over the local area network; and said AP receiving said start packet, and then sending an access request packet of a Remote Authentication Dial-In User Service (RADIUS) protocol to the AAA server so as to notify said AAA server that there is a terminal intending to access the 3G network.

The step of obtaining the identity information of said terminal can comprise:

the AAA sever sending an identity request message of the extensible authentication protocol to said terminal through the AP; and said terminal receiving said identity request message, and then comprising said identity information into an identity response message of the extensible authentication protocol, and sending the identity response message to said AAA server through the AP.

Said identity information can be a session initial protocol account binding with a terminal certificate of said terminal in the 3G network or an international mobile subscriber identifier of said terminal, which is recorded in the terminal certificate of said terminal.

The EAP-TLS negotiation process can comprise the following steps:

the AAA server sending an EAP request packet comprising a TLS start message to said terminal through the AP so as to start the EAP-TLS negotiation process;

said terminal sending an EAP response packet comprising a TLS client hello message to the AAA server through the AP, wherein said TLS client hello message comprises capability information of said terminal;

the AAA server sending an EAP request packet comprising a TLS server hello message and a TLS server key exchange message to said terminal through the AP, wherein said TLS server hello message comprises cipher suites and compression algorithms selected by the AAA server according to the capability information of said terminal, and said TLS server key exchange message comprises key exchange parameters of the side of the AAA server; and said terminal sending an EAP response packet comprising a TLS client key exchange message to the AAA server, wherein said TLS client key exchange message comprises key exchange parameters of the side of the terminal.

The EAP request packet which is sent to said terminal by the AAA server through the AP and comprises the TLS server hello message and the TLS server key exchange message can further comprise: a TLS certificate message and a TLS certificate request message; wherein said TLS certificate message includes an AAA server certificate and said TLS certificate request message is adapted for indicating said terminal to provide a terminal certificate;

the step of said terminal sending the EAP response packet comprising the TLS client key exchange message to the AAA server comprises: said terminal receiving said TLS certificate message and said TLS certificate request message, verifying the AAA server certificate comprised in the received TLS certificate message, and carrying a TLS certificate message comprising the terminal certificate in the sent EAP response packet according to the received TLS certificate request message; and after said terminal sending the EAP response packet comprising the TLS client key exchange message to the AAA server, the step of performing the EAP-TLS negotiation process can further comprise: the AAA server verifying the terminal certificate comprised in the received TLS certificate message.

The present invention also provides a system for accessing a 3G network, which is adapted for performing an access authentication of the 3G network to a wireless local area network terminal, and the system comprises: an AP of a wireless local area network and an AAA server of a 3G network, wherein:

said AP is configured to perform the access authentication of the wireless local area network to the terminal by using a WAPI protocol, and send a notification message indicating that the terminal intends to access the 3G network to said AAA server after the terminal accessing the wireless local area network; and said AAA server is configured to obtain identity information of the terminal through said AP, determine that said terminal is a subscription terminal of the 3G network according to said identity information, and then perform an EAP-TLS negotiation process with said terminal through said AP, and allow said terminal to access the 3G network after finishing the EAP-TLS negotiation process.

Said AP is configured to notify said AAA server that the terminal intends to access the 3G network by adopting the following way:

said AP receives a start packet of an extensible authentication protocol over a local area network sent by the terminal, and sends an access request packet of an RADIUS protocol to the AAA server so as to notify said AAA server that there is a terminal intending to access the 3G network.

Said AAA server is configured to obtain the identity information of said terminal by adopting the following way:

said AAA sever sends an identity request message of the extensible authentication protocol to the terminal through said AP; and said terminal receives said identity request message, and then comprises said identity information into an identity response message of the extensible authentication protocol, and sends to said AAA server through said AP.

Said identity information is a session initial protocol account binding with a terminal certificate of said terminal in the 3G network; or an international mobile subscriber identifier of said terminal, which is recorded in the terminal certificate of said terminal.

In conclusion, the present invention makes the WLAN terminal to use the same certificate to securely access the WLAN and 3G network at the same time after subscribing, by taking the WAPI terminal certificate as the certificate of accessing the 3G network, which is greatly convenient for users.

Furthermore, the present invention optimizes the access authentication method of the side of the AAA server, that is, the AAA server firstly obtains the terminal identity information through the AP, and performs the preliminary authentication to the terminal (i.e., judges whether the terminal is a subscription terminal) according to the terminal identity information, and then performs the EPA-TLS negotiation with the terminal, which avoids initiating the EAP-TLS negotiation with the WLAN terminal which does not subscribe in the 3G network, reduces the unnecessary processes (such as, the message interacting, the certificate verification, the signature verification, and so on), and improves the system efficiency.

PREFERRED EMBODIMENTS OF THE PRESENT INVENTION

The core idea of the present invention is that: after a terminal accesses a wireless local area network by adopting a WAPI protocol, the terminal notifies an AAA server of a 3G network through an AP of the wireless local area network that the terminal intends to access the 3G network; the AAA server obtains 3G access identity information of the terminal through the AP, and determines that the terminal is a subscription terminal of the 3G network, and then initiates an Extensible Authentication Protocol-Transport Layer Security (EAP-TLS) negotiation process; and the terminal and the AAA server finish the certification verification (i.e., access authentication) and the key exchange of the 3G network by the EAP-TLS negotiation process, mainly comprising:

(1) the terminal and the AAA server finishing negotiation of capability parameters (mainly including cipher suites and compression algorithms) of both parties by interacting of a TLS client hello message/a TLS server hello message;

(2) the terminal and the AAA server exchanging certificates of both parties by a TLS certificate message (optional);

(3) the terminal and the AAA server finishing the exchange of key parameters and the negotiation of keys by a TLS client key exchange message/a TLS server key exchange message.

Below the present invention will be described with reference to the drawings and embodiments in detail.

Figure 1:
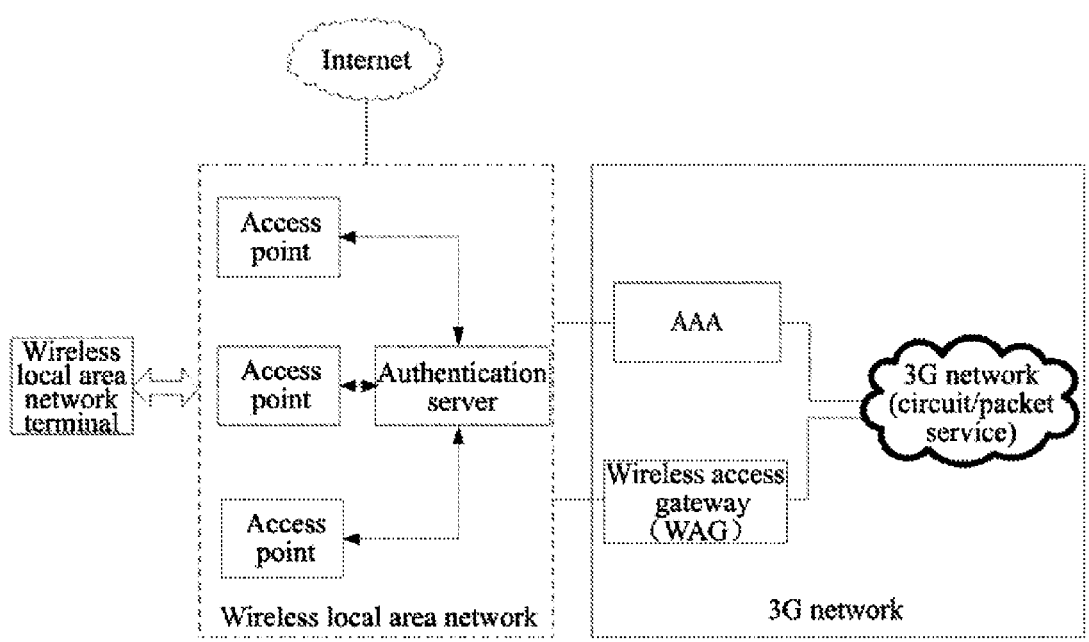
FIG. 1 is a schematic diagram of a WLAN terminal accessing a 3G network.
Figure 2:
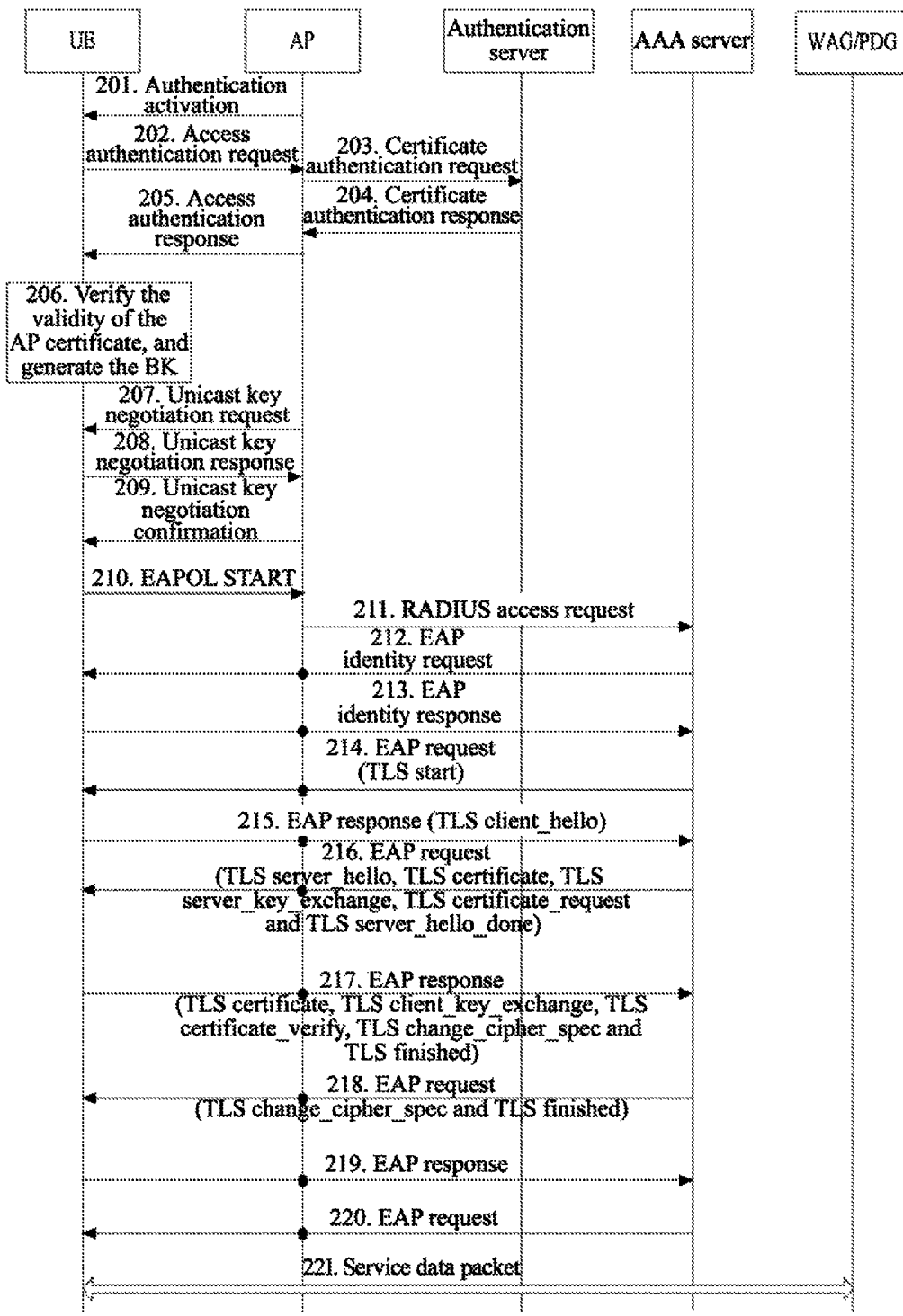
FIG. 2 is a flow chart of a method for a WLAN terminal accessing a 3G network according to an embodiment of the present invention.

FIG. 2 is a flow chart of a method for a WLAN terminal accessing a 3G network according to an embodiment of the present invention, and as shown in FIG. 2, the method comprises the steps as follows.

201, when the WLAN terminal (terminal or UE for short) associates or re-associates with an AP, the AP sends an authentication activation packet to the terminal.

The authentication activation packet includes: an AP certificate and an AP trusted authentication server identification.

202, after receiving the authentication activation packet, the terminal stores the AP certificate, selects an terminal certificate issued by an AP trusted authentication server according to the AP trusted authentication server identification, generates a pair of temporary keys (including a temporary public key px and a temporary private key sx) used by the Elliptic Curve Diffie-Hellman (ECDH) exchange, and sends an access authentication request packet to the AP.

The access authentication request packet includes: parameters such as the terminal certification, the temporary public key px of the terminal, a signature of the terminal, and so on.

203, after receiving the access authentication request packet, the AP verifies whether the signature of the terminal is correct: if the signature of the terminal is correct, the AP sends a certificate authentication request packet to the authentication server; otherwise, the AP discards the access authentication request packet, and the flow ends.

The certificate authentication request packet includes: the AP certificate and the terminal certificate.

204, after receiving the certificate authentication request packet, the authentication server verifies the AP certificate and the terminal certificate, and includes a certificate verification result and a signature of the authentication server into a certificate authentication response packet to send to the AP.

205, after receiving the certificate authentication response packet, the AP checks whether the terminal certificate is valid according to the included certificate verification result and signature of the authentication server thereinto, and if the terminal certificate is invalid, the AP discards the certificate authentication response packet, and the flow ends; if the terminal certificate is valid, the AP generates a pair of temporary keys (including: a temporary public key py and a temporary private key sy) for the ECDH exchange, uses the temporary private key sy of the AP and the temporary public key px of the terminal to perform ECDH calculation to obtain a basic key BK, and sends an access authentication response packet to the terminal.

The access authentication response packet includes: the certificate verification result, the signature of the authentication server, the temporary public key py of the AP and a signature of the AP.

206, after receiving the access authentication response packet, the terminal checks whether the AP certificate is valid according to the certificate verification result, the signature of the authentication server and the signature of the AP: if the AP certificate is invalid, the terminal discards the access authentication response packet, and the flow ends; otherwise, the terminal uses the temporary private key sx of the terminal and the temporary public key py of the AP to perform the ECDH calculation to obtain a basic key BK.

It should be noted that the basic key BK generated by the AP and the basic key BK generated by the terminal are the same according to the ECDH principle.

Through the interacting of steps 201-206, the terminal and the AP have finished a certificate authentication process, and have negotiated the basic key BK in the certificate authentication process; in the subsequent steps, the terminal and the AP will use the basic key BK to negotiate and generate a unicast session key.

207, the AP sends a unicast key negotiation request packet to the terminal.

The unicast key negotiation request packet includes: parameters such as a random number $N_1$ generated by the AP and so on.

208, after receiving the unicast key negotiation request packet, the terminal generates a random number $N_2$; uses the basic key BK, the random number $N_1$ and the random number $N_2$ to calculate and generate the unicast session key; and sends a unicast key negotiation response packet to the AP.

The unicast key negotiation response packet includes parameters such as the random number $N_2$ and so on.

209, after receiving the unicast key negotiation response packet, the AP uses the basic key BK, the random number $N_1$ and the random number $N_2$ to calculate and generate the unicast session key, sends a unicast key negotiation confirmation packet to the terminal, and ends a unicast key negotiation process.

So far, the terminal and the AP have finished the certificate authentication process and the unicast session key negotiation process of the WAPI protocol and the terminal has successfully accessed the wireless local area network. In the following steps, the terminal will access the 3G network by adopting an EAP-TLS negotiation process, and in that process, between the terminal and the AP an EAP-TLS message is encapsulated by an EAPoL protocol, between the WLAN access network and the AAA server of the 3G network the EAP-TLS message is encapsulated by a Remote Authentication Dial-In User Service (RADIUS) protocol, and between the terminal and the AP encryption of a link layer can be performed by using the unicast session key negotiated and obtained in the above unicast key negotiation process.

210, when the terminal intends to access the 3G network, the terminal firstly sends to the AP an EAP over LAN (EAPoL) START packet to notify the AP that the terminal intends to access the 3G network.

211, after receiving the EAPoL START packet sent by the terminal, the AP encapsulates the EAPoL START into an access request packet of the RADIUS protocol, and sends the access request packet to the AAA server of the 3G network to notify the AAA server that there is a terminal intending to access the 3G network.

212, after receiving the above access request packet, the AAA server sends an Extensible Authentication Protocol (EAP) identity request (EAP-Request/Identity) message through the AP to the terminal so as to obtain identity information of the terminal.

213, after receiving the EAP-Request/Identity message, the terminal includes the identity information recorded in the subject alias field of the terminal certificate into an EAP identity response (EAP-Response/Identity) message to send to the AAA server through the AP.

The above identity information recorded in the subject alias field can be information such as a Session Initial Protocol (SIP) account binding with the terminal certificate in the 3G network or an International Mobile Subscriber Identifier (IMSI), and so on.

214, after receiving the EAP-Response/Identity message, the AAA server judges whether the terminal has subscribed (i.e., whether the terminal is a subscription terminal of the 3G network) according to the terminal identity information carried in that message, if the terminal has not subscribed, the flow ends; and if the terminal has subscribed, the AAA server sends an EAP request packet including a TLS Start message to the terminal through the AP, and starts to perform the TLS negotiation process.

The AAA server can search the terminal identity information carried in the above message in the locally stored user subscription information or the user subscription information stored in the HSS, and judges whether the corresponding terminal has subscribed according to the searching result.

215, the terminal starts a normal TLS handshake process, and sends an EAP response packet including a TLS client hello (TLS client_hello) message to the server.

The TLS client_hello message includes TLS capability information of the terminal, and specifically includes parameters such as a TLS version number, session identification, an initial random number, cipher suites and compression algorithms supported by the client, and so on.

216, the AAA server sends an EAP request packet including a TLS server hello (TLS server hello) message, a TLS certificate message, a TLS server key exchange (TLS server_key_exchange) message, a TLS certificate request (TLS certificate_request) message and a TLS server hello done (TLS server_hello_done) message to the terminal through the AP; wherein:

the TLS server hello message includes: information such as the cipher suites and the compression algorithms supported by the AAA server which are selected, by the AAA server, from the cipher suites and the compression algorithms supported by the terminal, according to the capability information of the terminal, and so on;

the TLS certificate message includes an AAA server certificate;

the TLS server key exchange message includes key exchange parameters of the side of the AAA server;

the TLS certificate request message is adapted for indicating the terminal to provide the certificate; and the TLS server hello done message is adapted for denoting that a server handshake process of the present stage is done and the AAA server starts to wait for a response of the terminal.

217, after receiving the above EAP request packet, the terminal verifies the AAA server certificate included in the TLS certificate message, and sends an EAP response packet including a TLS certificate message, a TLS client key exchange (TLS client_key_exchange) message, a TLS certificate verify (TLS certificate_verify) message, a TLS change cipher specification (change_cipher_spec) message and a TLS handshake finished (TLS finished) message to the AAA server through the AP after passing the verification; wherein:

the TLS certificate message includes the terminal certificate;

the TLS client key exchange message includes key exchange parameters of the side of the terminal;

the TLS certificate verify message includes the signature information of the terminal so as to prevent an unauthorized terminal from pretending that terminal to access the 3G network;

the TLS change cipher specification message is adapted for notifying the AAA server to start to use new cipher suites and compression algorithms; and the TLS handshake finished message is adapted for denoting that the terminal has finished the TLS handshake protocol of the present stage.

218, after receiving the above EAP response packet, the AAA server verifies the included terminal certificate and the signature of the terminal thereinto; if the verification fails, the AAA server discards that packet, and the flow ends; and if the verification is passed, the AAA server sends an EAP request packet including the TLS change cipher specification (TLS change_cipher_spec) message and the TLS handshake finished (TLS finished) message to the terminal through the AP; wherein:

the TLS change cipher specification message is adapted for notifying the terminal to start to use the new cipher suites and compression algorithms; and the TLS handshake finished message is adapted for denoting that the AAA server has finished the TLS handshake protocol of the present stage.

219, the terminal sends an EAP response packet to the AAA server to indicate that the TLS negotiation has been finished.

220, the AAA server sends an EAP success (EAP-SUCCESS) message to denote that the terminal certificate authentication (i.e., access authentication) has been finished and the session key has been negotiated, and the terminal is allowed to access the 3G network.

221, after receiving the EAP-SUCCESS message, the terminal obtains that the access authentication succeeds, and thus uses resources of the 3G network through a Wireless Access Gateway (WAG)/Packet Data Gateway (PDG) to initiate 3G services such as video, audio, and so on.

According to the basic principle of the present invention, the above embodiment also can have various modifications, for example:

(1) according to the WAPI protocol, besides negotiating the BK in the certificate authentication process shown in steps 201-205, the terminal and the AP also can use a Pre-Shared Key (PSK) to directly derive the BK;

(2) according to the WAPI protocol, the AP also can verify the certificate locally after receiving the access authentication request including the terminal certificate, so steps 203-204 can be omitted; similarly, the terminal also needn't use the certificate verification result of the authentication server, but verifies the AP certificate locally;

(3) in step 211, the AP obtains that the terminal intends to access the 3G network after receiving the EAPoL START packet sent by the terminal, that is, the AP obtains that subsequent message interacting between the terminal and the AAA server is adapted for the access authentication and the key negotiation of the 3G network; and thus the AP is able to not perform the encryption of the link layer to the EAP-TLS message in the subsequent EAP-TLS negotiation process, and the terminal is also unnecessary to perform the encryption of the link layer to the EAP-TLS message.

Figure 3:
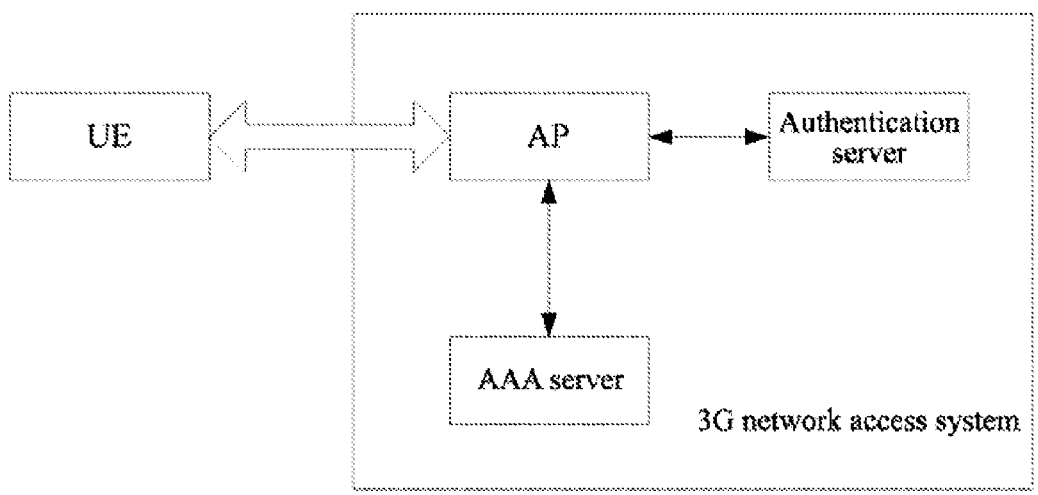
FIG. 3 is a structure schematic diagram of a system for accessing a 3G network according to an embodiment of the present invention.

FIG. 3 is a structure schematic diagram of a system for accessing a 3G network according to an embodiment of the present invention. The system is used for performing the access authentication of the 3G network to the wireless local area network terminal (terminal for short). The system comprises: an AP of the wireless local area network, an authentication server of the wireless local area network and an AAA server of the 3G network, wherein:

the AP and the authentication server are adapted for performing the access authentication of the wireless local area network to the terminal by adopting the WAPI protocol, and the AP sends a notification message of intending to access the 3G network by the terminal to the AAA server after the terminal accessing the wireless local area network; and the AAA server is adapted for obtaining identity information of the terminal through the AP, determining the terminal is a subscription terminal of the 3G network according to said identity information, and then performing a EAP-TLS negotiation process with the terminal through the AP; and allowing the terminal to access the 3G network after finishing the EAP-TLS negotiation process.

The above identity information is recorded in a terminal certificate, including: the Session Initial Protocol account binding with the terminal certificate in the 3G network, or the International Mobile Subscriber Identifier of the terminal.

The AP can notify the AAA server that the terminal intends to access the 3G network by adopting the following way: the AP sends an access request packet of the RADIUS protocol to the AAA server after receiving a start packet of an extensible authentication protocol over a local area network sent by the terminal, so as to notify the AAA server that there is a terminal intending to access the 3G network.

The AAA server can obtain the identity information of the terminal by adopting the following way: the AAA server sends an identity request message of the extensible authentication protocol to the terminal through the AP; after receiving this message, the terminal includes the identity information into an identity response message of the extensible authentication protocol, and sends to the AAA server through the AP.

The other network elements included in the above system, detail functions of each network element, and the connection relationship (message interacting relationship) between two of the network elements refer to the above description part of the method shown in FIG. 2.

INDUSTRIAL APPLICABILITY

The present invention optimizes the access authentication method of the side of the AAA server, that is, the AAA server firstly obtains the terminal identity information through the AP, and performs the preliminary authentication to the terminal (i.e., judges whether the terminal is a subscription terminal) according to the terminal identity information, and then performs the EPA-TLS negotiation with the terminal, which avoids initiating the EAP-TLS negotiation with the WLAN terminal which does not subscribe in the 3G network, reduces the unnecessary processes (such as, the message interacting, the certificate verification, the signature verification, and so on), and improves the system efficiency.

What is claimed is:

1. A method for accessing a 3G network, comprising the following step of:
   a terminal accessing a wireless local area network (WLAN) by adopting a Wireless Local Area Network Authentication Privacy Infrastructure (WAPI) protocol, wherein said terminal has no capability to read a Universal Integrated Circuit Card (UICC) such as a Subscriber Identity Module (SIM) card, and a WAPI terminal certificate of the terminal is used in access authentication of the access process;
   after said terminal successfully accesses said WLAN, said terminal notifying an Authentication Authorization Accounting (AAA) server of a 3G network through an access point (AP) of the WLAN that said terminal intends to access the 3G network;
   said AAA server obtaining identity information of said terminal recorded in said WAPI terminal certificate of the terminal through said AP, determining that said terminal is a subscription terminal of the 3G network according to said identity information, and then performing an Extensible Authentication Protocol-Transport Layer Security (EAP-TLS) negotiation process with said terminal through the said AP, wherein during the EAP-TLS negotiation process, a TLS certificate massage sent from said terminal to said AAA server through said AP contains said WAPI terminal certificate; and
   said terminal accessing the 3G network after finishing the EAP-TLS negotiation process.

2. The method as claimed in claim 1, wherein the step of notifying the AAA server of the 3G network through the AP of the wireless local area network that said terminal intends to access the 3G network comprises:
   said terminal sending a start packet of the extensible authentication protocol over the local area network; and
   said AP receiving said start packet, and sending an access request packet of a Remote Authentication Dial-In User Service (RADIUS) protocol to the AAA server so as to notify said AAA server that there is a terminal intending to access the 3G network.

3. The method as claimed in claim 1, wherein the step of said AAA server obtaining the identity information of said terminal through the AP comprises:
   the AAA sever sending an identity request message of the extensible authentication protocol to said terminal through the AP; and
   said terminal receiving said identity request message, comprising said identity information into an identity response message of the extensible authentication protocol, and sending the identity response message to said AAA server through the AP.

4. The method as claimed in claim 1, wherein,
   said identity information is one of the following information:
   a session initial protocol account binding with the terminal certificate of said terminal in the 3G network; or
   an international mobile subscriber identifier of said terminal.

5. The method as claimed in claim 1, wherein the step of performing the EAP-TLS negotiation process comprises:
   the AAA server sending an EAP request packet comprising a TLS start message to said terminal through the AP so as to start the EAP-TLS negotiation process;
   said terminal sending an EAP response packet comprising a TLS client hello message to the AAA server through the AP, wherein said TLS client hello message comprises capability information of said terminal;
   the AAA server sending an EAP request packet comprising a TLS server hello message and a TLS server key exchange message to said terminal through the AP, wherein said TLS server hello message comprises cipher suites and compression algorithms selected by the AAA server according to the capability information of said terminal, and said TLS server key exchange message comprises key exchange parameters of the side of the AAA server; and
   said terminal sending an EAP response packet comprising a TLS client key exchange message to the AAA server, wherein said TLS client key exchange message comprises key exchange parameters of the side of the terminal.

6. The method as claimed in claim 5, wherein
   the EAP request packet which is sent to said terminal by the AAA server through the AP and comprises the TLS server hello message and the TLS server key exchange message further comprises: a TLS certificate message and a TLS certificate request message; wherein said TLS certificate message comprises an AAA server certificate and said TLS certificate request message is adapted for indicating said terminal to provide a terminal certificate;
   the step of said terminal sending the EAP response packet comprising the TLS client key exchange message to the AAA server comprises:

said terminal receiving said TLS certificate message and said TLS certificate request message, verifying the AAA server certificate comprised in the received TLS certificate message, and carrying a TLS certificate message comprising the terminal certificate in the sent EAP response packet according to the received TLS certificate request message; and after said terminal sending the EAP response packet comprising the TLS client key exchange message to the AAA server, the step of performing the EAP-TLS negotiation process further comprises:

the AAA server verifying the terminal certificate comprised in the received TLS certificate message.

7. A system for accessing a 3G network, comprising: an AP of a wireless local area network and an AAA server of a 3G network, wherein:

said AP is configured to perform an access authentication of the wireless local area network to a terminal by using a WAPI protocol, wherein said terminal has no capability to read a Universal Integrated Circuit Card (UICC) such as a Subscriber Identity Module (SIM) card, and a WAPI terminal certificate of the terminal is used in said access authentication, and after said terminal successfully accesses said wireless local area network, when receiving a notification message that said terminal intends to access the 3G network, send the notification message to said AAA server; and said AAA server is configured to, after receiving said notification message, obtain identity information of said terminal recorded in said WAPI terminal certificate of the terminal through said AP, determine that said terminal is a subscription terminal of the 3G network according to said identity information, and then perform an EAP-TLS negotiation process with said terminal through said AP, wherein during the EAP-TLS negotiation process, a TLS certificate massage sent from said terminal to said AAA server through said AP contains said WAPI terminal certificate, and allow said terminal to access the 3G network after finishing the EAP-TLS negotiation process.

8. The system as claimed in claim 7, wherein, said AP is configured to notify said AAA server that there is a terminal intending to access the 3G network by adopting the following way that:

said AP receives a start packet of an extensible authentication protocol over a local area network sent by the terminal, and sends an access request packet of an RADIUS protocol to the AAA server so as to notify said AAA server that there is a terminal intending to access the 3G network.

9. The system as claimed in claim 7, wherein, said AAA server is configured to obtain the identity information of said terminal by adopting the following way that:

said AAA sever sends an identity request message of the extensible authentication protocol to the terminal through said AP; and said terminal receives said identity request message, comprises said identity information into an identity response message of the extensible authentication protocol, and sends to said AAA server through said AP.

10. The system as claimed in claim 9, wherein, said identity information of said terminal is one of the following information:

a session initial protocol account binding with the terminal certificate of the terminal in the 3G network; or an international mobile subscriber identifier of the terminal.

11. The method as claimed in claim 2, wherein the step of said AAA server obtaining the identity information of said terminal through the AP comprises:

the AAA sever sending an identity request message of the extensible authentication protocol to said terminal through the AP; and said terminal receiving said identity request message, comprising said identity information into an identity response message of the extensible authentication protocol, and sending the identity response message to said AAA server through the AP.

12. The system as claimed in claim 8, wherein, said AAA server is configured to obtain the identity information of said terminal by adopting the following way that:

said AAA sever sends an identity request message of the extensible authentication protocol to the terminal through said AP; and said terminal receives said identity request message, comprises said identity information into an identity response message of the extensible authentication protocol, and sends to said AAA server through said AP.2.

13. The system as claimed in claim 12, wherein, said identity information of said terminal is one of the following information:

a session initial protocol account binding with the terminal certificate of the terminal in the 3G network; or an international mobile subscriber identifier of the terminal.

* * * * *